United States Patent
Li et al.

(10) Patent No.: US 11,423,600 B2
(45) Date of Patent: Aug. 23, 2022

(54) METHODS AND APPARATUS FOR CONFIGURING A TEXTURE FILTER PIPELINE FOR DEEP LEARNING OPERATION

(71) Applicant: QUALCOMM Incorporated, San Diego, CA (US)

(72) Inventors: Liang Li, San Diego, CA (US); Elina Kamenetskaya, Belmont, MA (US); Andrew Evan Gruber, Arlington, MA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/938,397

(22) Filed: Jul. 24, 2020

(65) Prior Publication Data
US 2022/0028155 A1 Jan. 27, 2022

(51) Int. Cl.
| | |
|---|---|
| *G06T 15/00* | (2011.01) |
| *G06T 15/04* | (2011.01) |
| *G06T 1/20* | (2006.01) |
| *G06F 7/544* | (2006.01) |
| *G06F 7/523* | (2006.01) |
| *G06F 7/50* | (2006.01) |
| *G06N 20/00* | (2019.01) |
| *G06N 3/08* | (2006.01) |

(52) U.S. Cl.
CPC ............... *G06T 15/04* (2013.01); *G06F 7/50* (2013.01); *G06F 7/523* (2013.01); *G06F 7/5443* (2013.01); *G06N 20/00* (2019.01); *G06T 1/20* (2013.01); *G06T 15/005* (2013.01); *G06N 3/08* (2013.01)

(58) Field of Classification Search
CPC ......... G06T 19/00; G06T 17/20; G06T 17/00; G06T 15/10; G06T 15/00
USPC ............................................. 345/419
See application file for complete search history.

(56) References Cited

U.S. PATENT DOCUMENTS

2020/0167654 A1* 5/2020 Guo ..................... G06N 5/003
2021/0350139 A1* 11/2021 Pardeshi ............ G06K 9/00751

OTHER PUBLICATIONS

Gharbi, M., etc., Deep Bilateral Learning for Real-Time Image Enhancement. ACM Transactions on Graphics, vol. 36, No. 4, Article 118. Publication date: Jul. 2017. [online], [Retrieved on Jul. 2, 2021], Retrieved from the Internet: <URL: https://arxiv.org/pdf/1707.02880.pdf> (Year: 2017).*

* cited by examiner

*Primary Examiner* — Gordon G Liu
(74) *Attorney, Agent, or Firm* — Campbell C. Chiang; Procopio, Cory, Hargreaves & Savitch LLP

(57) ABSTRACT

The present disclosure relates to methods and apparatus for configuring a texture filtering logic unit for deep learning operation. The apparatus can map one or more inputs of a deep learning operation to a respective input of a texture filtering logic unit in a graphics pipeline. Moreover, the apparatus can generate, by the texture filtering logic unit, at least one output for the deep learning operation based on the one or more inputs mapped to the texture filtering logic unit. Furthermore, the apparatus can communicate the at least one output to a programmable shader, which can analyze the output result to determine information relating to an input image based on the deep learning operation.

28 Claims, 11 Drawing Sheets

METHODS AND APPARATUS FOR CONFIGURING A TEXTURE FILTER PIPELINE FOR DEEP LEARNING OPERATION

TECHNICAL FIELD

The present disclosure relates generally to processing systems and, more particularly, to one or more techniques for performing deep learning operations using a texture filtering pipeline.

INTRODUCTION

Computing devices often utilize a graphics processing unit (GPU) to accelerate the rendering of graphical data for display. Such computing devices may include, for example, computer workstations, mobile phones such as so-called smartphones, embedded systems, personal computers, tablet computers, and video game consoles. GPUs execute a graphics processing pipeline that includes one or more processing stages that operate together to execute graphics processing commands and output a frame. A central processing unit (CPU) may control the operation of the GPU by issuing one or more graphics processing commands to the GPU. Modern day CPUs are typically capable of concurrently executing multiple applications, each of which may need to utilize the GPU during execution. A device that provides content for visual presentation on a display generally includes a GPU.

Typically, a GPU of a device is configured to perform the processes in a graphics processing pipeline. However, current GPUs use separate shader logic units or dedicated logic cores to perform deep learning operations, which leaves texture filtering logic units of the graphics processing pipeline unused or idle during execution of the deep learning algorithms. Therefore, there has developed an increased need for improved utilization of system resources to perform deep learning operations by GPUs.

SUMMARY

The following presents a simplified summary of one or more aspects in order to provide a basic understanding of such aspects. This summary is not an extensive overview of all contemplated aspects, and is intended to neither identify key elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a GPU that includes a graphics processing pipeline. The apparatus may configure texture filtering logic units in the graphics processing pipeline for deep learning operation. The apparatus may map one or more inputs of a deep learning operation to a respective input of at least one texture filtering logic unit in a graphics pipeline; generate, by the at least one texture filtering logic unit, at least one output for the deep learning operation based on the one or more inputs mapped to the at least one texture filtering logic unit; and communicate the at least one output to a programmable shader. Additionally, the one or more inputs may be based on one or more batch weight features and one or more activation features. The apparatus may also map a plurality of batch weight features and a plurality of activation features to respective inputs of the at least one texture filtering logic unit. In addition, the at least one texture filtering logic unit may be a plurality of texture filtering arithmetic logic units (ALUs). The apparatus may map a plurality of batch weight features to respective RGBA input channels of the plurality of texture filtering ALUs; and map a plurality of activation features to respective weight input channels of the plurality of texture filtering ALUs. Moreover, the apparatus may execute a convolution operation as a dot product and accumulation of the plurality of batch weight features in a first two-dimensional array with the plurality of activation features in a second two-dimensional array. The apparatus may also recursively loop through a plurality of first and second two-dimensional arrays; and accumulate respective outputs of the plurality of texture filtering ALUs to generate the at least one output for the deep learning operation by applying respective current outputs of the convolution operation with previously accumulated outputs of the convolution operation. In addition, the apparatus may generate the at least one output for the deep learning operation based on a matrix operation. The one or more inputs of the deep learning operation may include one or more input matrices and at least one output matrix that corresponds to the generated at least one output for the deep learning operation. The apparatus may generate the at least one output for the deep learning operation by calculating the at least one output by multiplying the one or more input matrices to produce the at least one output matrix. Moreover, the apparatus may store the at least one output in an electronic memory. The apparatus may also map at least one batch of predetermined weight features as the one or more inputs of the deep learning operation to the respective inputs of the at least one texture filtering logic unit in a graphics pipeline to define the at least one output for the deep learning operation. The at least one output for the deep learning operation may indicate at least one of an identification of content of an image, a prediction of a next image in an image sequence of the content, and an identification of a missing part of the image. Furthermore, the graphics pipeline may be a graphics processing unit (GPU) fixed pipeline and the at least one texture filtering logic unit may comprise a render target blending ALU.

The details of one or more examples of the disclosure are set forth in the accompanying drawings and the description below. Other features, objects, and advantages of the disclosure will be apparent from the description and drawings, and from the claims.

DETAILED DESCRIPTION

Figure 1:
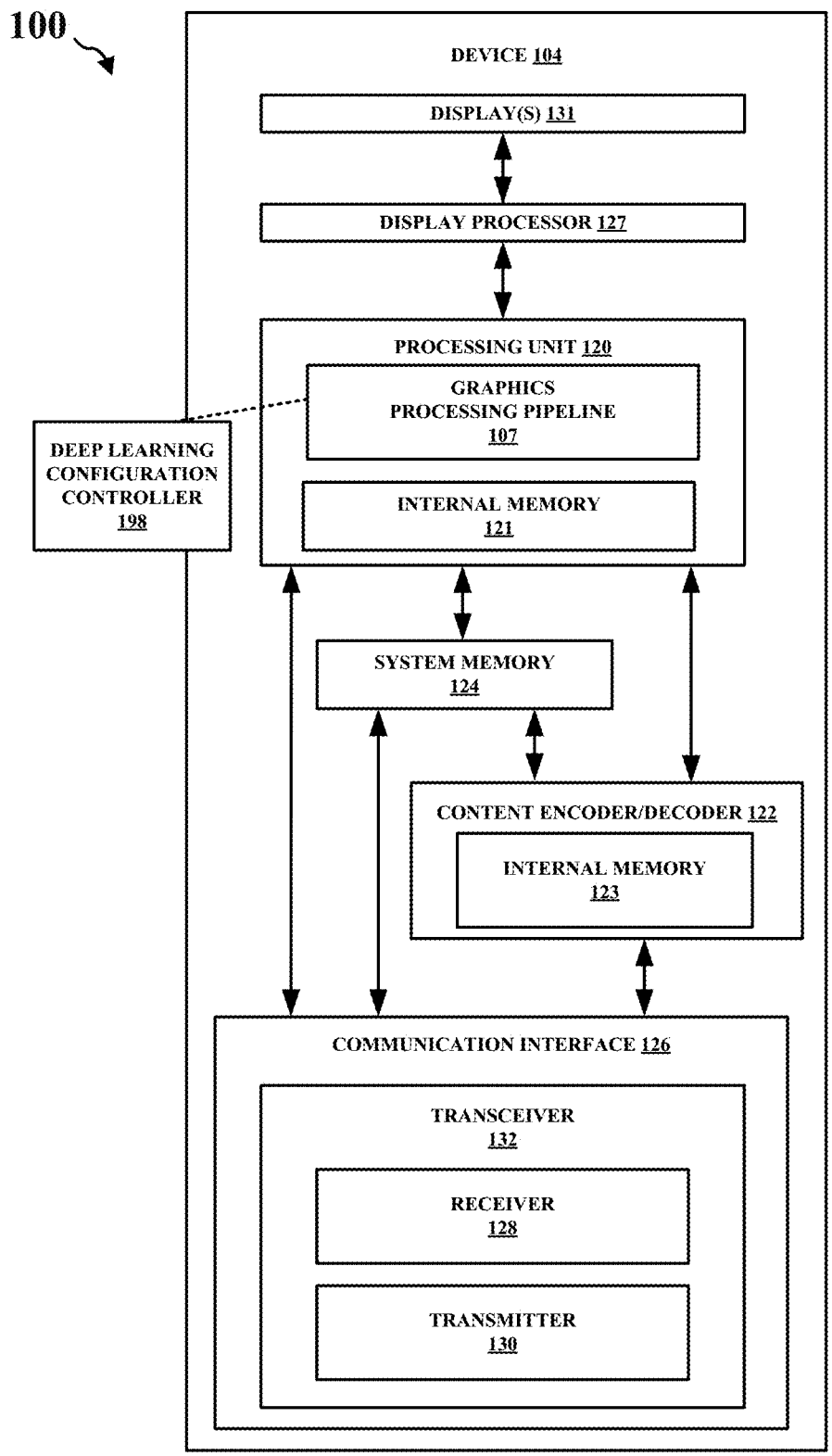
FIG. 1 is a block diagram that illustrates an example content processing system configured to implement one or more techniques of this disclosure.

Generally, a graphics processing unit (GPU) is a specialized electronic circuit designed to rapidly manipulate and alter memory to accelerate the creation of images in a frame buffer intended for output to a display device. GPUs can be in embedded systems, mobile phones, personal computers, workstations, and the like, as described in detail below with respect to FIG. 1. The highly parallel structure of GPUs makes them more efficient than general-purpose central processing units (CPUs) to process large blocks of data in parallel. Moreover, deep learning algorithms and architectures use convolution or matrix multiplication operations, but current GPUs implement such deep learning algorithms using either shader logic units or a dedicated logic unit core, which leaves texture filter logic units of the GPU unused or idle during the performing of the deep learning algorithms. Aspects of the present disclosure provide apparatuses and methods for configuring texture filtering logic units in the processing pipeline of the GPU for deep learning operations. More particularly, the present disclosure provides for techniques of configuring the texture filtering logic units to perform deep learning operations, including convolution operations and matrix multiply operations by mapping one or more inputs of a deep learning operation to a respective input of at least one texture filtering logic unit in a graphics pipeline; and generating, by the at least one texture filtering logic unit, at least one output for the deep learning operation based on the one or more input features mapped to the at least one texture filtering logic unit.

Various aspects of systems, apparatuses, computer program products, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of this disclosure to those skilled in the art. Based on the teachings herein, one skilled in the art should appreciate that the scope of this disclosure is intended to cover any aspect of the systems, apparatuses, computer program products, and methods disclosed herein, whether implemented independently of, or combined with, other aspects of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. Any aspect disclosed herein may be embodied by one or more elements of a claim.

Although various aspects are described herein, many variations and permutations of these aspects fall within the scope of this disclosure. Although some potential benefits and advantages of aspects of this disclosure are mentioned, the scope of this disclosure is not intended to be limited to particular benefits, uses, or objectives. Rather, aspects of this disclosure are intended to be broadly applicable to different technologies, system configurations, networks, and processing protocols, some of which are illustrated by way of example in the figures and in the following description. The detailed description and drawings are merely illustrative of this disclosure rather than limiting, the scope of this disclosure being defined by the appended claims and equivalents thereof.

Several aspects are presented with reference to various apparatus and methods. These apparatus and methods are described in the following detailed description and illustrated in the accompanying drawings by various blocks, components, circuits, processes, algorithms, and the like (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors (which may also be referred to as processing units). Examples of processors include microprocessors, microcontrollers, graphics processing units (GPUs), general purpose GPUs (GPGPUs), central processing units (CPUs), application processors, digital signal processors (DSPs), reduced instruction set computing (RISC) processors, systems-on-chip (SOC), baseband processors, application specific integrated circuits (ASICs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software can be construed broadly to mean instructions, instruction sets, code, code segments, program code, programs, subprograms, software components, applications, software applications, software packages, routines, subroutines, objects, executables, threads of execution, procedures, functions, and the like, whether referred to as software, firmware, middleware, microcode, hardware description language, or otherwise. The term application may refer to software. As described herein, one or more techniques may refer to an application, i.e., software, being configured to perform one or more functions. In such examples, the application may be stored on a memory, e.g., on-chip memory of a processor, system memory, or any other memory. Hardware described herein, such as a processor may be configured to execute the application. For example, the application may be described as including code that, when executed by the hardware, causes the hardware to perform one or more techniques described herein. As an example, the hardware may access the code from a memory and execute the code accessed from the memory to perform one or more techniques described herein. In some examples, components are identified in this disclosure. In such examples, the components may be hardware, software, or a combination thereof. The components may be separate components or sub-components of a single component.

Accordingly, in one or more examples described herein, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

In general, this disclosure describes techniques for having a graphics processing pipeline in a single device or multiple devices, analyzing graphical content, and/or reducing the load of a processing unit, i.e., any processing unit configured to perform one or more techniques described herein, such as a GPU. For example, this disclosure describes techniques for graphics processing in any device that utilizes graphics processing. Other example benefits are described throughout this disclosure.

As used herein, instances of the term "content" may refer to "graphical content," "image," and vice versa. This is true regardless of whether the terms are being used as an adjective, noun, or other parts of speech. In some examples, as used herein, the term "graphical content" may refer to a content processed by one or more processes of a graphics processing pipeline.

In some examples, as used herein, the term "display content" may refer to content generated by a processing unit configured to perform displaying processing. In some examples, as used herein, the term "display content" may refer to content generated by a display processing unit. Graphical content may be processed to become display content. For example, a graphics processing unit may output graphical content, such as a frame, to a buffer (which may be referred to as a framebuffer). A display processing unit may read the graphical content, such as one or more frames from the buffer, and perform one or more display processing techniques thereon to generate display content. For example, a display processing unit may be configured to perform composition on one or more rendered layers to generate a frame. As another example, a display processing unit may be configured to compose, blend, or otherwise combine two or more layers together into a single frame. A display processing unit may be configured to perform scaling, e.g., upscaling or downscaling, on a frame. In some examples, a frame may refer to a layer. In other examples, a frame may refer to two or more layers that have already been blended together to form the frame, i.e., the frame includes two or more layers, and the frame that includes two or more layers may subsequently be blended.

FIG. 1 is a block diagram that illustrates an example content processing system 100 configured to implement one or more techniques of this disclosure. The content generation system 100 includes a device 104. The device 104 may include one or more components or circuits for performing various functions described herein. In some examples, one or more components of the device 104 may be components of an SOC. The device 104 may include one or more components configured to perform one or more techniques of this disclosure. In the example shown, the device 104 may include a processing unit 120, a content encoder/decoder 122, and a system memory 124. In some aspects, the device 104 can include a number of optional components, e.g., a communication interface 126, a transceiver 132, a receiver 128, a transmitter 130, a display processor 127, and one or more displays 131. Reference to the display 131 may refer to the one or more displays 131. For example, the display 131 may include a single display or multiple displays. In further examples, the results of the graphics processing may not be displayed on the device, e.g., the first and second display may not receive any frames for presentment thereon. Instead, the frames or graphics processing results may be transferred to another device.

According to an exemplary aspect, the processing unit 120 may include an internal memory 121. Moreover, in the exemplary aspect, the processing unit 120 is configured to perform graphics processing, i.e., in graphics processing pipeline 107 as will be discussed in more detail below. The content encoder/decoder 122 may include an internal memory 123. In some examples, the device 104 may include a display processor, such as the display processor 127, to perform one or more display processing techniques on one or more frames generated by the processing unit 120 before presentment by the one or more displays 131. The display processor 127 may be configured to perform display processing. For example, the display processor 127 may be configured to perform one or more display processing techniques on one or more frames generated by the processing unit 120. The one or more displays 131 may be configured to display or otherwise present frames processed by the display processor 127. In some examples, the one or more displays 131 may include one or more of: a liquid crystal display (LCD), a plasma display, an organic light emitting diode (OLED) display, a projection display device, an augmented reality display device, a virtual reality display device, a head-mounted display, or any other type of display device.

Memory external to the processing unit 120 and the content encoder/decoder 122, such as system memory 124, may be accessible to the processing unit 120 and the content encoder/decoder 122. For example, the processing unit 120 and the content encoder/decoder 122 may be configured to read from and/or write to external memory, such as the system memory 124. The processing unit 120 and the content encoder/decoder 122 may be communicatively coupled to the system memory 124 over a bus. In some examples, the processing unit 120 and the content encoder/decoder 122 may be communicatively coupled to each other over the bus or a different connection.

The content encoder/decoder 122 may be configured to receive graphical content from any source, such as the system memory 124 and/or the communication interface 126. The system memory 124 may be configured to store received encoded or decoded graphical content. The content encoder/decoder 122 may be configured to receive encoded or decoded graphical content, e.g., from the system memory 124 and/or the communication interface 126, in the form of encoded pixel data. The content encoder/decoder 122 may be configured to encode or decode any graphical content.

The internal memory 121 or the system memory 124 may include one or more volatile or non-volatile memories or storage devices. In some examples, internal memory 121 or the system memory 124 may include RAM, SRAM, DRAM, erasable programmable ROM (EPROM), electrically erasable programmable ROM (EEPROM), flash memory, a magnetic data media or an optical storage media, or any other type of memory.

In an exemplary aspect, the internal memory 121 or the system memory 124 may be a non-transitory storage medium according to some examples. The term "non-transitory" may indicate that the storage medium is not embodied in a carrier wave or a propagated signal. However, the term "non-transitory" should not be interpreted to mean that internal memory 121 or the system memory 124 is non-movable or that its contents are static. As one example, the system memory 124 may be removed from the device 104 and moved to another device. As another example, the system memory 124 may not be removable from the device 104.

The processing unit 120 may be a central processing unit (CPU), a graphics processing unit (GPU), a general purpose GPU (GPGPU), or any other processing unit that may be configured to perform graphics processing. In some examples, the processing unit 120 may be integrated into a motherboard of the device 104. In some examples, the processing unit 120 may be present on a graphics card that is installed in a port in a motherboard of the device 104, or may be otherwise incorporated within a peripheral device configured to interoperate with the device 104.

According to an aspect, the graphics pipeline 107 of the processing unit 120 includes one or more arithmetic logic units (ALUs), and specifically one or more graphics texture ALUs that are configured to perform texture filtering to determine texture colors for texture mapped pixels based on colors of nearby texels (i.e., pixels of the texture). As will be described in detail below, the processing unit 120 can reconfigure the one or more graphics texture ALUs to perform deep learning operations for processing the display content according to an exemplary aspect.

It is further noted that if the techniques are implemented partially in software, the processing unit 120 may store instructions for the software in a suitable, non-transitory computer-readable storage medium, e.g., internal memory 121, and may execute the instructions in hardware using one or more processors to perform the techniques of this disclosure. Any of the foregoing, including hardware, software, a combination of hardware and software, etc., may be considered to be one or more processors.

The content encoder/decoder 122 may be any processing unit configured to perform content decoding. In some examples, the content encoder/decoder 122 may be integrated into a motherboard of the device 104. The content encoder/decoder 122 may include one or more processors, such as one or more microprocessors, application specific integrated circuits (ASICs), field programmable gate arrays (FPGAs), ALUs, digital signal processors (DSPs), video processors, discrete logic, software, hardware, firmware, other equivalent integrated or discrete logic circuitry, or any combinations thereof. If the techniques are implemented partially in software, the content encoder/decoder 122 may store instructions for the software in a suitable, non-transitory computer-readable storage medium, e.g., internal memory 123, and may execute the instructions in hardware using one or more processors to perform the techniques of this disclosure. Any of the foregoing, including hardware, software, a combination of hardware and software, etc., may be considered to be one or more processors.

In some aspects, the content generation system 100 can include an optional communication interface 126. The communication interface 126 may include a receiver 128 and a transmitter 130. The receiver 128 may be configured to perform any receiving function described herein with respect to the device 104. The transmitter 130 may be configured to perform any transmitting function described herein with respect to the device 104. For example, the transmitter 130 may be configured to transmit information to another device, which may include a request for content. The receiver 128 and the transmitter 130 may be combined into a transceiver 132. In such examples, the transceiver 132 may be configured to perform any receiving function and/or transmitting function described herein with respect to the device 104. In an exemplary aspect, the transmitter 130 may be configured to transmit the output result from the processing unit 120 to a programmable shader (not shown in FIG. 1) that can be configured for specialized functions, such as any type of video image post-processing. In another aspect, the graphics processing pipeline 107 can include one or more programmable shading units that may concurrently execute multiple instances of what is commonly referred to as a "shader program", which may be referred to as threads, which can be a stream of instructions that form a program or thread of execution.

Referring again to FIG. 1, the graphics processing pipeline 107 can include a deep learning configuration controller 198 provided for configuring the graphics pipeline 107 for performing deep learning operations, including convolution operations and matrix multiply operations. That is, the one or more graphics texture ALUs in a graphics pipeline 107 are typically configured to performing traditional linear filtering. According to an exemplary aspect, the deep learning configuration controller 198 is configured to map inputs (e.g., workloads) for deep learning operations to the one or more graphics texture ALUs to utilize the graphics processing pipeline 107, which is otherwise idle and unused during execution of deep learning algorithms.

In general, it is noted that a device, such as the device 104, may refer to any device, apparatus, or system configured to perform one or more techniques described herein. For example, a device may be a server, a base station, user equipment, a client device, a station, an access point, a computer, e.g., a personal computer, a desktop computer, a laptop computer, a tablet computer, a computer workstation, or a mainframe computer, an end product, an apparatus, a phone, a smart phone, a server, a video game platform or console, a handheld device, e.g., a portable video game device or a personal digital assistant (PDA), a wearable computing device, e.g., a smart watch, an augmented reality device, or a virtual reality device, a non-wearable device, a display or display device, a television, a television set-top box, an intermediate network device, a digital media player, a video streaming device, a content streaming device, an in-car computer, any mobile device, any device configured to generate graphical content, or any device configured to perform one or more techniques described herein. Processes herein may be described as performed by a particular component (e.g., a GPU), but, in further embodiments, can be performed using other components (e.g., a CPU), consistent with disclosed embodiments.

Figure 2:
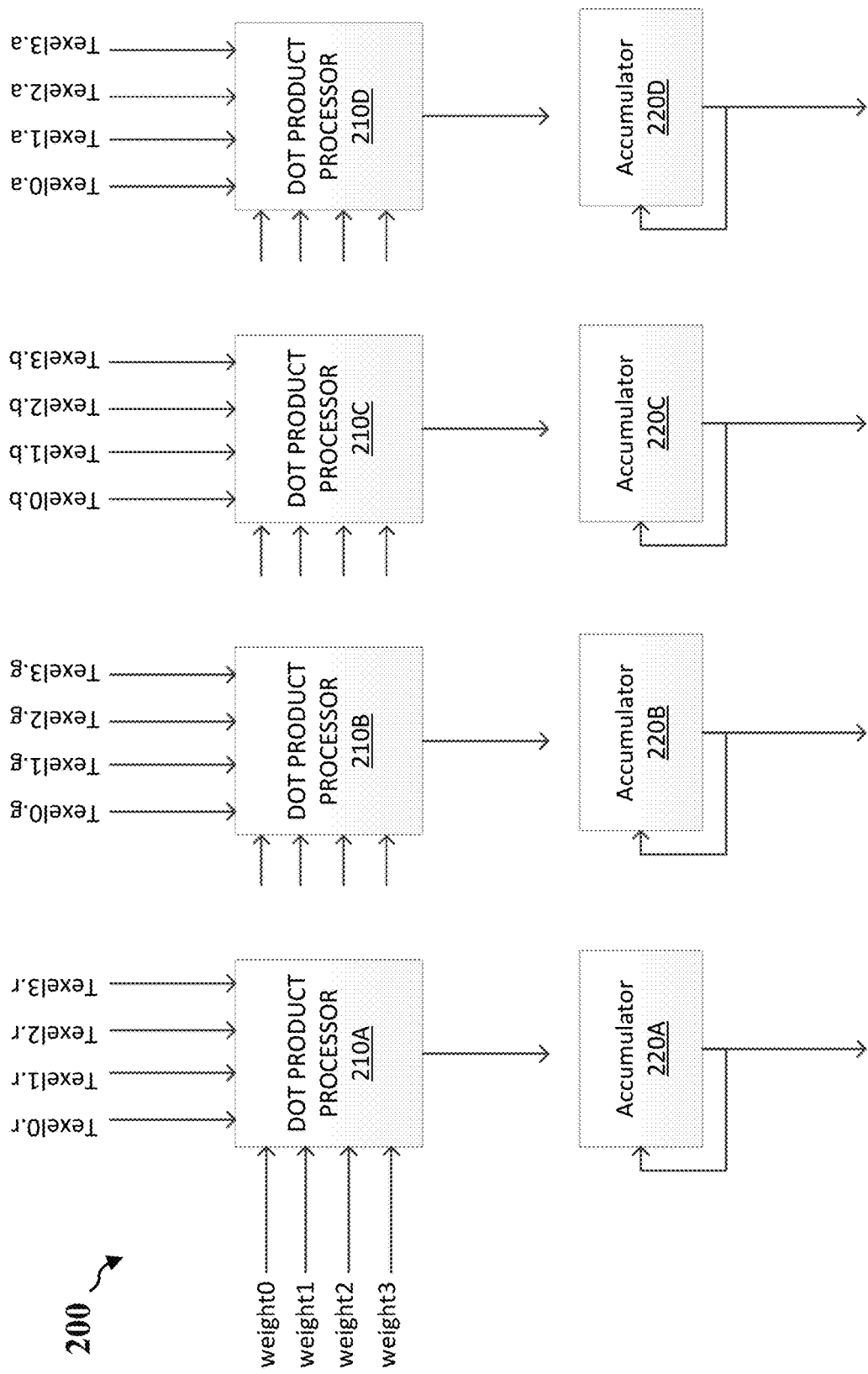
FIG. 2 illustrates an example of a graphics texture pipeline in accordance with one or more techniques of this disclosure.

FIG. 2 illustrates an embodiment of a graphics texture pipeline 200 in accordance with one or more techniques of this disclosure. In general, the graphics texture pipeline 200 can correspond to graphics processing pipeline 107 described above with respect to FIG. 1. As shown in FIG. 2, the graphics texture pipeline 200 can include one or more ALUs, i.e., graphics texture ALUs that are configured to process a plurality of inputs and generate respective outputs. In an aspect as shown, each graphics texture ALUs includes a dot product processor that can receive up to 4 by 4 inputs (e.g., "DP4") and an accumulator configured for accumulating outputs of the respective dot processor. Thus, as shown, a first graphics texture ALU includes dot product processor 210A and accumulator 220A, a second graphics texture ALU includes dot product processor 210B and accumulator 220B, a third graphics texture ALU includes dot product processor 210C and accumulator 220C, and a fourth graphics texture ALU includes dot product processor 210D and accumulator 220D, In a typical configuration, each dot product processors ALU 210A-210D receives separate texel data on a first four input channels and weighting values on a second four input channels. More particularly, the same four weighting values weight 0 to weight 3 are input to each of the four dot product processors 210A-210D. Separate texel values in the RGBA color model are input to separate channels of each of the four dot product processors 210A-210D.

In operation, dot product processor 210A is configured to generate an output as follows: (input.texel0.r*w0+input.texel1.r*w1+input.texel2.r*w2+input.texel3.r*w3). Similarly, dot product processor 210B is configured to generate an output as follows: (input.texel0.g*w0+input.texel1.g*w1+input.texel2.g*w2+input.texel3.g*w3). Dot product processor 210C is configured to generate an output as follows: (input.texel0.b*w0+input.texel1.b*w1+input.texel2.b*w2+input.texel3.b*w3). Finally, dot product processor 210D is configured to generate an output as follows: (input.texel0.a*w0+input.texel1.a*w1+input.texel2.a*w2+input.texel3.a*w3). Moreover, each of the accumulators 220A to 220D is configured to generate a final output as the current output from the respective dot product processor plus previous result(s), and, therefore, accumulates the output from the respective dot product processor.

Referring back to FIG. 1 the deep learning configuration controller 198 is configured to reconfigure the one or more graphics texture ALUs to perform deep learning operations, such as convolution operations and matrix multiplying operations, by mapping the workload (i.e., the input features) for the deep learning architecture to the input channels of the one or more graphics texture ALUs. In other words, the deep learning configuration controller 198 may be configured to change the input channels of the one or more graphics texture ALUs to utilize their configurations for performing the deep learning operations, such as convolution operations or matrix multiplying operations according to an aspect.

Figure 3A:
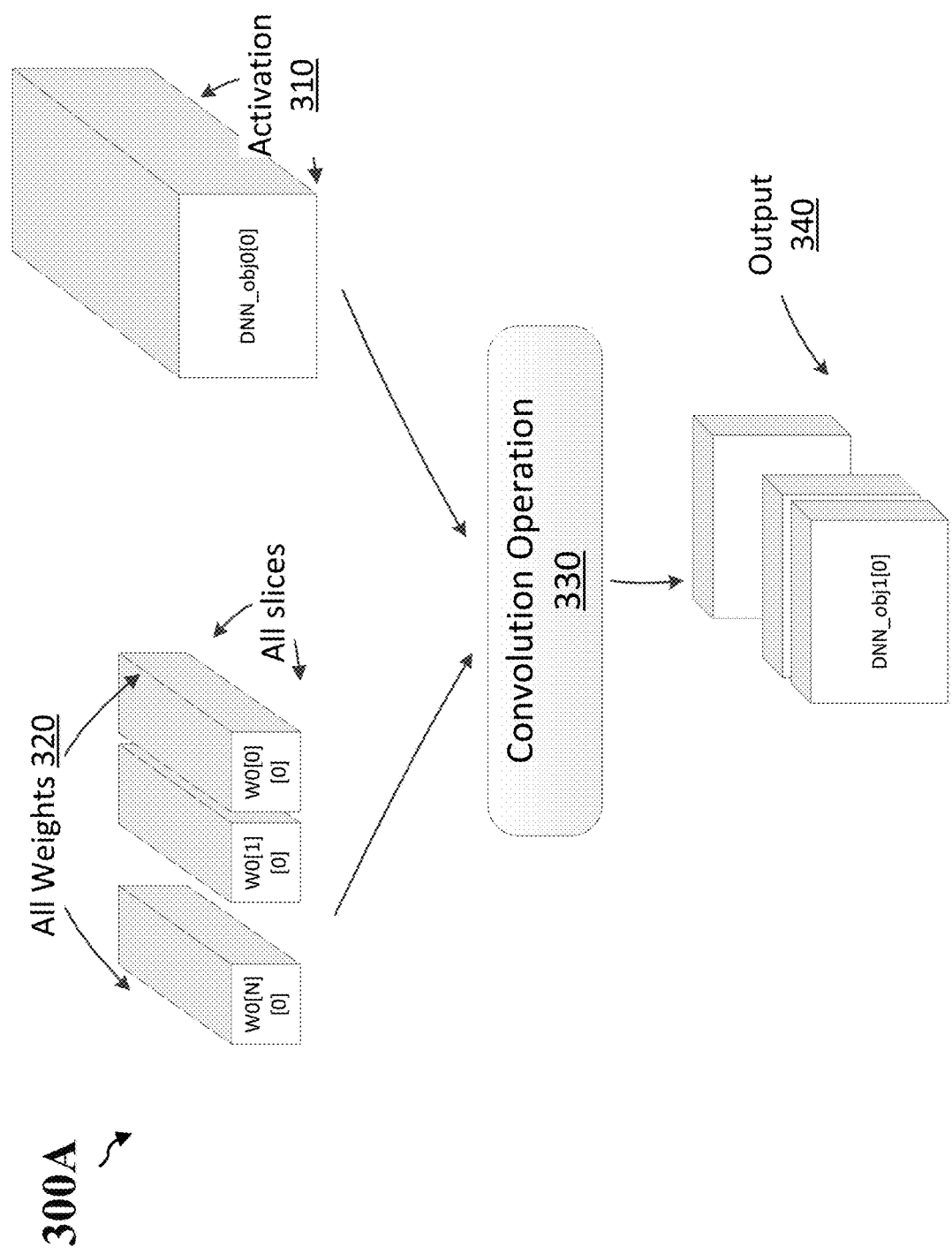
FIG. 3A illustrates a diagrams of a DNN convolution operation in accordance with one or more techniques of this disclosure.
Figure 3B:
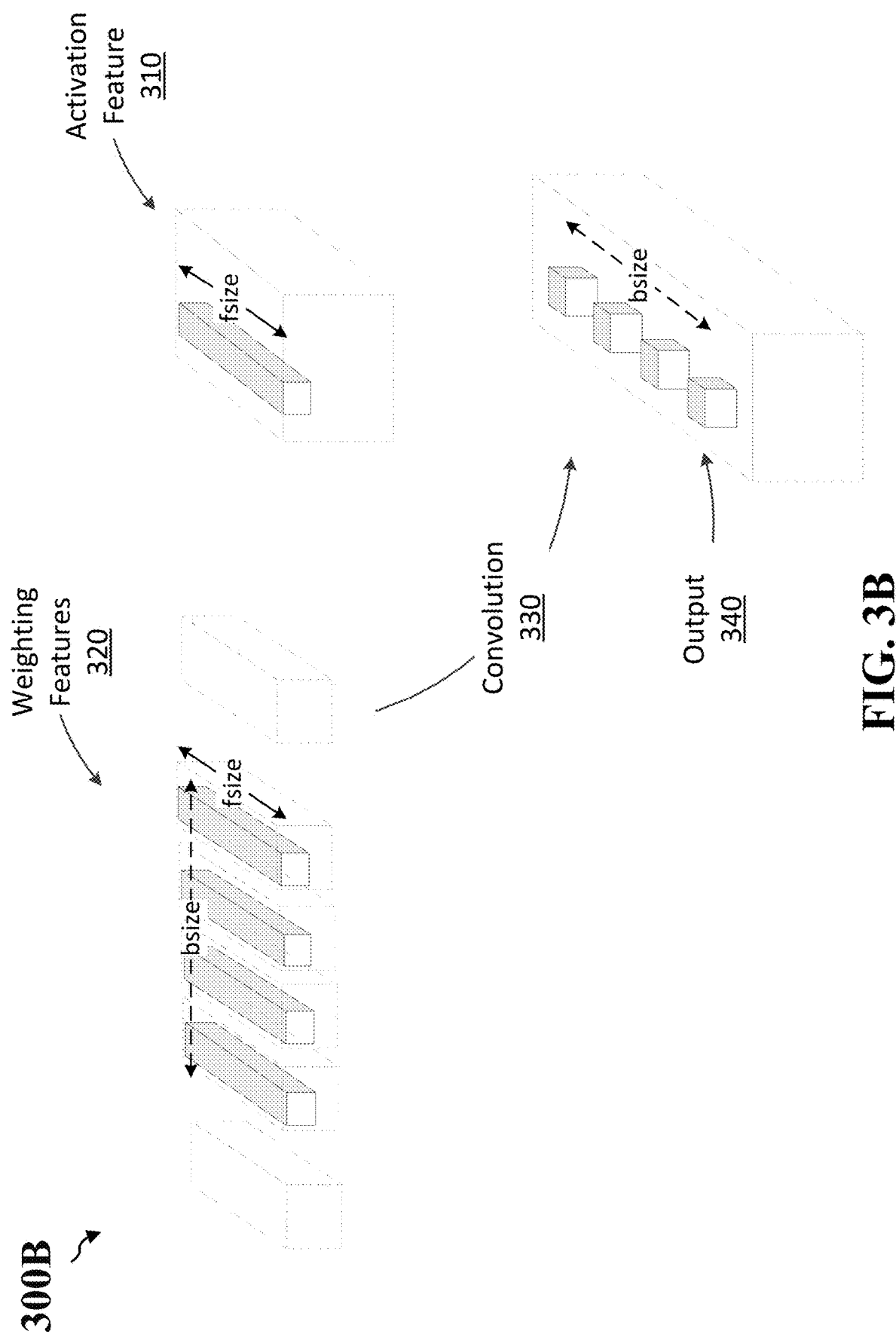
FIG. 3B illustrates a more detailed flow diagram of the DNN convolution operation shown in FIG. 3A in accordance with one or more techniques of this disclosure.
Figure 3C:
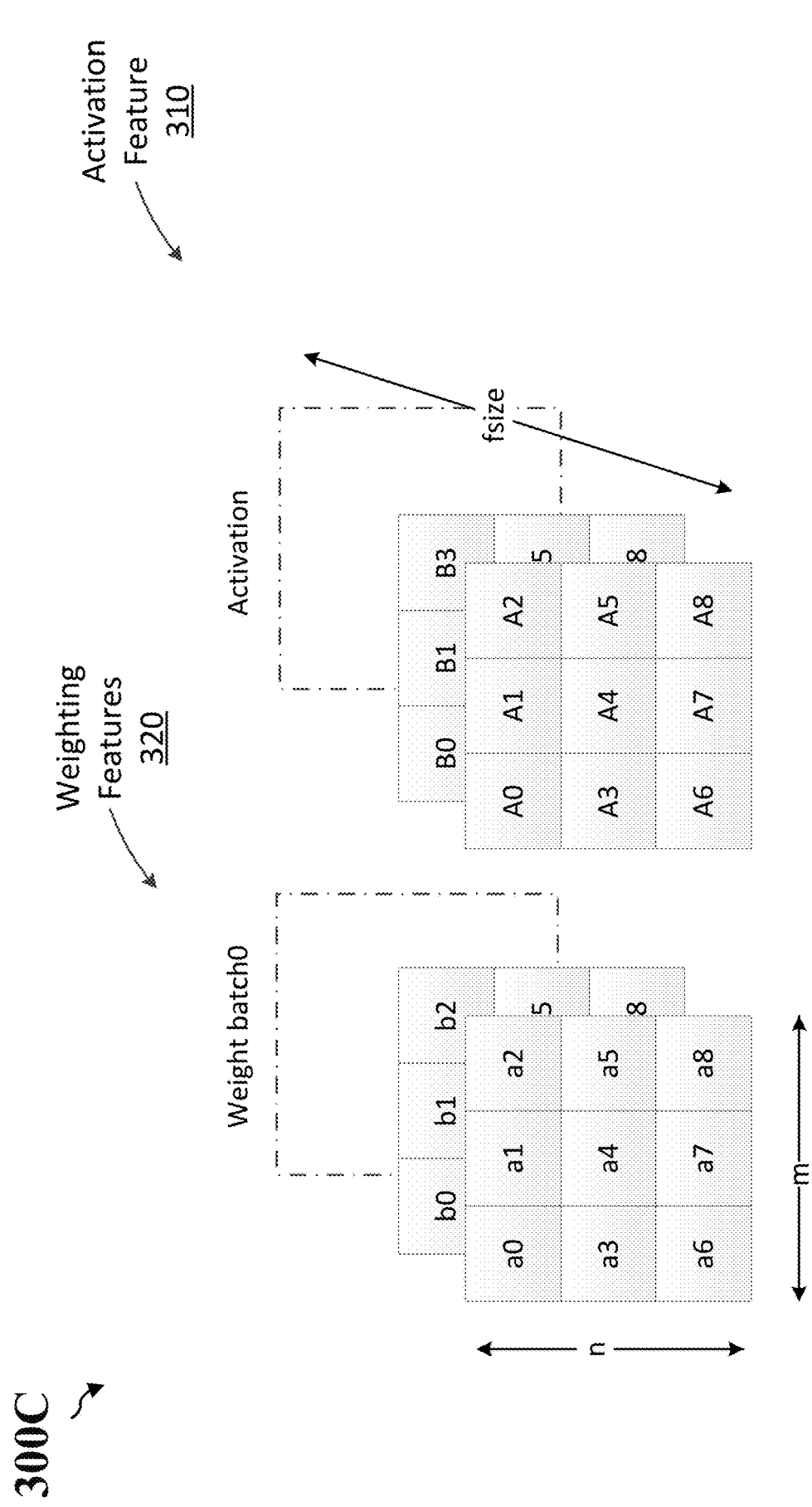
FIG. 3C illustrates an example diagram of the workload for the DNN convolution operation shown in FIGS. 3A and 3B in accordance with one or more techniques of this disclosure.

FIGS. 3A to 3C illustrate example flow diagrams of DNN convolution operation in accordance with one or more techniques of this disclosure. In general, a deep neural network (DNN) may be an artificial neural network (ANN) with multiple layers between the inputs and outputs. The DNN determines the correct mathematical manipulation to turn the input into the output and moves through the multiple layers to calculate the probability of each output. As shown in FIGS. 3A to 3C, a DNN convolution operation is executed as a dot product and accumulation of weight values in a first two-dimensional array with activation values in a second two-dimensional array. Moreover, both of the two-dimensional arrays may have the same slice number (e.g., features). Furthermore, the output of the convolution operation is also a two-dimensional array having different slices coming from different respective batches of the input weight two-dimensional array.

As generally shown in FIG. 3A, an operation 300A is shown in which a first input of the workload for the convolution operation 330 can be an activation feature 310 (e.g., "DNN_obj0[0]"), which can be one or more feature activation values at a location (e.g., a pixel value) in an image of the display content. Moreover, a second input of the workload for the convolution operation 330 can be a plurality of predetermined weight values to be applied to the feature activation value(s). In one aspect, based on the predetermined training of the DNN (i.e., the predetermined weight values), the one or more graphics texture ALUs will be configured to extract particular information from the image. That is, the final output can include one or more of an identification of the content of the image, a prediction of the next image in the image sequence of the video content, one or more missing parts of the image and/or the like. In an aspect, the deep learning configuration controller 198 may be configured to access the predetermined weight values 320 (e.g., W0[0][0], W0[1][0] . . . W0[N][0]) from system memory 124 and can be selected based on the desired deep learning operation and result.

In any event, the one or more graphics texture ALUs are configured to perform convolution operation 330 to generate an output 340 (e.g., "DNN_obj1[0]"). That is, for each weighting value W, an output is generated that is an accumulation of the dot product of the input data for all slices of the activation features in the two-dimensional array and the weight values in the two-dimensional array.

FIG. 3B illustrates a more detailed flow diagram of the DNN convolution operation shown in FIG. 3A in accordance with one or more techniques of this disclosure. As shown, an operation 300B is shown in which the activation feature(s) 310 comprises an "fsize" or feature size, which may be defined by multiple slices of a two-dimensional image. Moreover, the weighting features 320 comprise a "bsize" or batch size that defines the number of weight values of the batch to be applied to the activation feature by the convolution operation 330. Convolution operation 330 can be executed using the workload as the activation feature(s) 310 and the weighting features 320. A resulting output 340 of the convolution operation 330 is shown to include a number of output values that correspond to the batch size "bsize" of the weighting features 320.

FIG. 3C illustrates an example diagram of the workload for the DNN convolution operation shown in FIGS. 3A and 3B in accordance with one or more techniques of this disclosure. As shown and also described above, an operation 300C is provided in which the activation feature(s) 310 comprises an "fsize" or feature size having a plurality of slice. In an aspect, the slices can include n vertical values (e.g., three values) by m horizontal values (e.g., three values), which is shown to be A0 to A8, B0 to B8 and so forth. Similarly, the weighting features 320 comprise a "bsize" or batch size, which is shown to be a0 to a8, b0 to b8 and so forth. In an aspect, the resulting output 340 of the convolution operation 330 of these workloads will equal a0*A0+a1*A1+ . . . a8*A8+b0*B0+b1*B1+ . . . b8*B8 and so forth for the given number of slices.

In an aspect as described above, the deep learning configuration controller 198 is configured to reconfigure the one or more graphics texture ALUs to perform deep learning operations, including the convolution operation shown in FIGS. 3A to 3C, by mapping the workload (e.g., the activation feature(s) 310 and weighting features 320) to the input channels of the one or more graphics texture ALUs.

Figure 4:
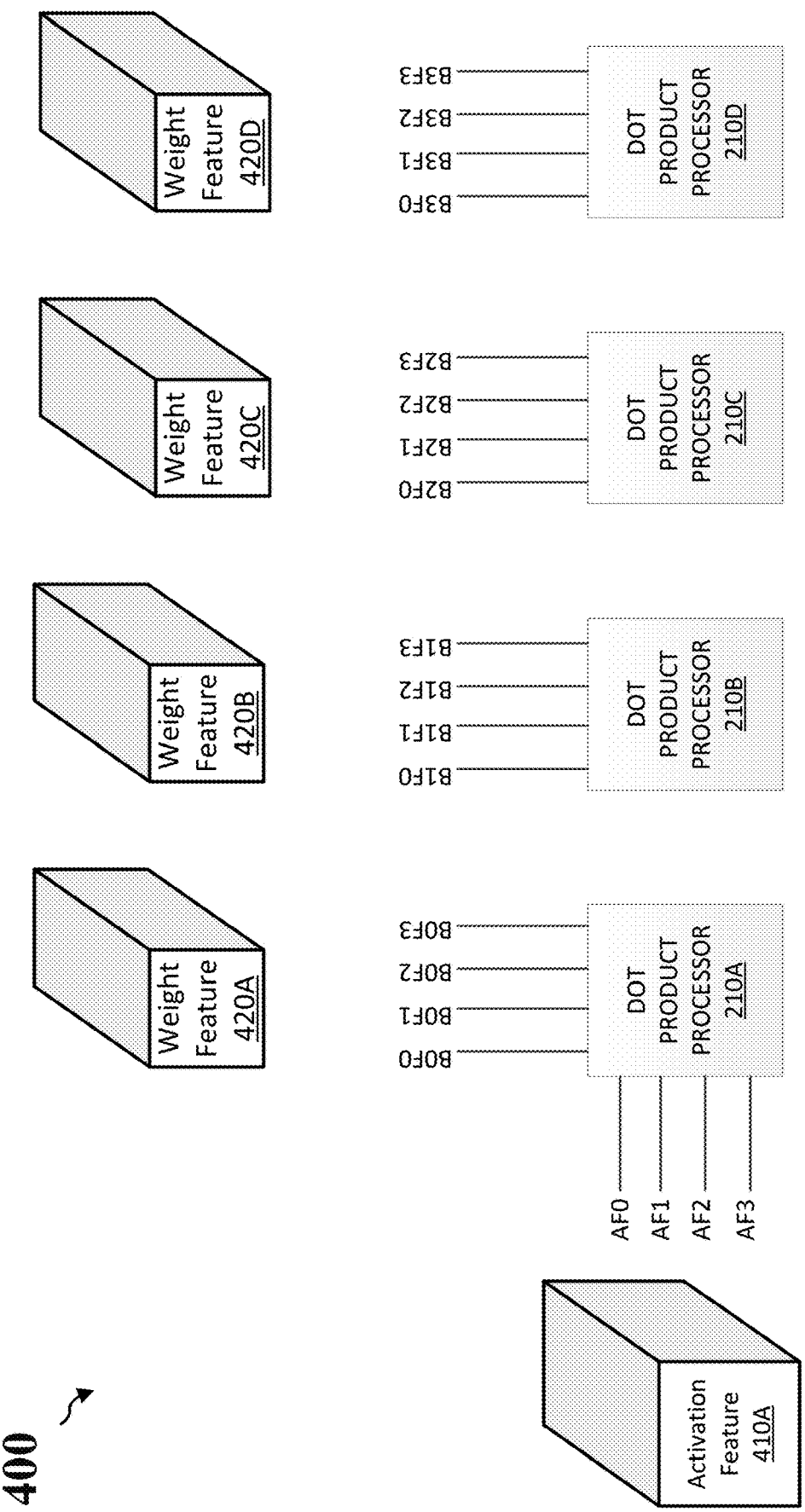
FIG. 4 illustrates an example diagram in accordance with one or more techniques of this disclosure.

FIG. 4 illustrates an example diagram in accordance with one or more techniques of this disclosure. In an aspect, the deep learning configuration controller 198 may be configured to change the input channels of the one or more graphics texture ALUs in graphics processing pipeline 107 of FIG. 1 to utilize their configurations for performing the deep learning operations, such as the convolution operation 330 described above. As shown, a system 400 is configured in which dot product processors 210A to 210D are provided and correspond to those described above with respect to FIG. 2. However, as shown, the input channels of dot product processors 210A to 210D can be mapped to one or more activation features 410A and one or more weight features 420A to 420D. Activation feature 410A corresponds activation feature(s) 310 described above. Similarly, Batch features 420A to 420D correspond to the weighting features 320 have a batch size.

Thus, as shown, the deep learning configuration controller 198 can be configured to map the activation's four feature pixels to the four weighting inputs of each of the graphics texture ALUs in graphics processing pipeline 107. That is, during one cycle of the convolution operation, the same activation features (e.g., AF0 to AF3) are input to each of the graphics texture ALUs. Moreover, the deep learning configuration controller 198 can be configured to map the weight batch feature pixels to input channels (e.g., RGBA input channels) of the one or more graphics texture ALUs in graphics processing pipeline 107. Thus, a first slice of weight features 420A (e.g., B0F0 to B0F3) is input to the RGBA input channels of dot processor 210A, a second slice of weight features 420B (e.g., B1F0 to B1F3) is input to the RGBA input channels of dot processor 210B, and so forth. In an aspect, the output for each pixel is four texels, which is equal to the activation's four input values multiplied by the four slices of the weight features 420A to 420B.

Figure 5:
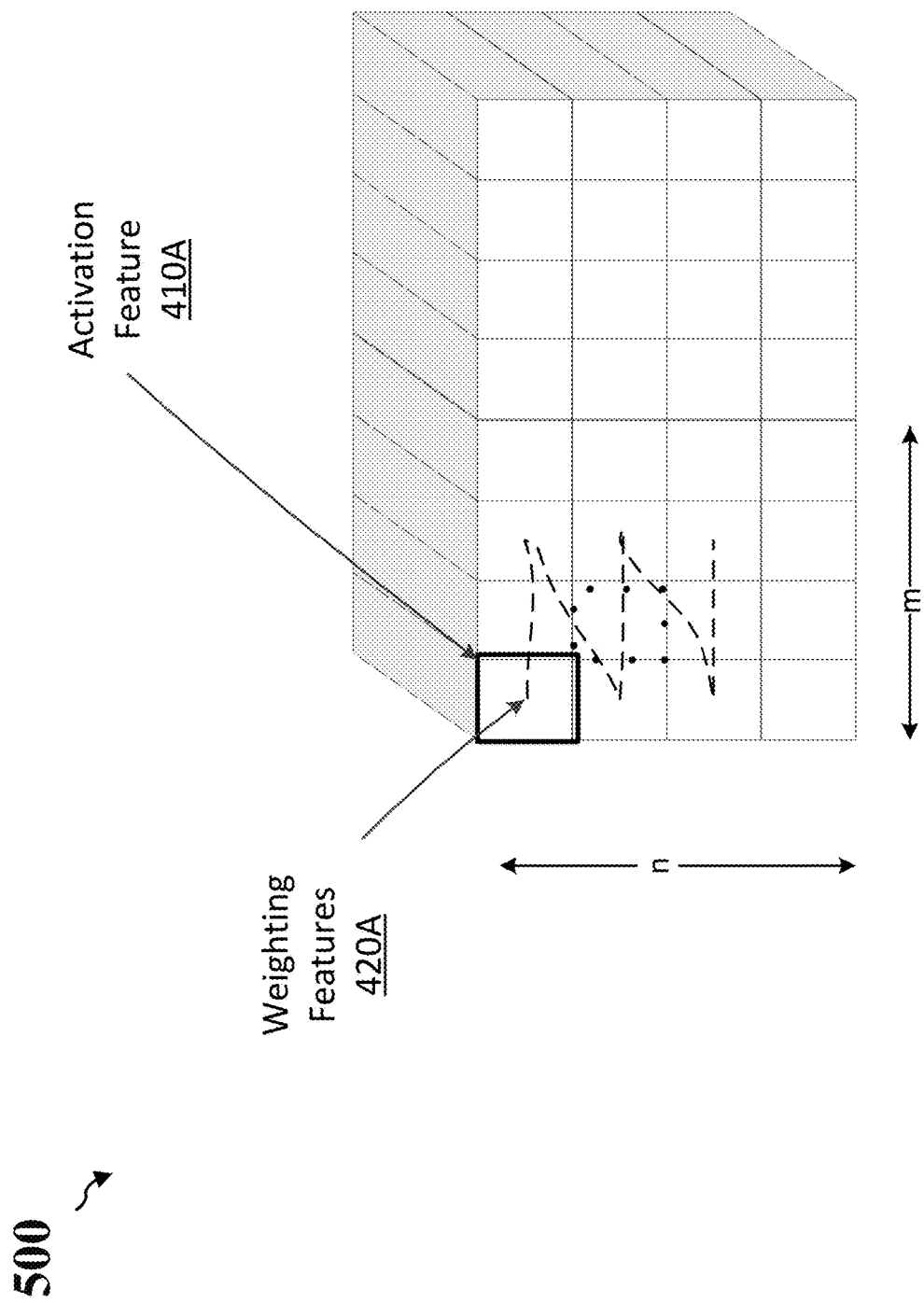
FIG. 5 illustrates an example diagram in accordance with one or more techniques of this disclosure.

FIG. 5 illustrates an example diagram in accordance with one or more techniques of this disclosure. In an aspect, an operation 500 is shown in which the one or more graphics texture ALUs may further be configured to loop the slices of weight features as described above with respect to FIG. 3C. Thus, as shown in FIG. 5, activation features loop through the m*n weight features to generate the output. In other words, the respective graphics texture ALU can loop the activation feature 410A through the weight features 420A, which can correspond to weight features a0 to a8 as shown in FIG. 3C in an aspect. This recursive looping can be performed for each batch of weight features (e.g., weight features 420A to 420D). Referring back to FIG. 2, the graphics texture ALUs further include accumulators 220A to 220D that may be configured to accumulate the respective convolution outputs 340 from the recursive looping performed by each of the dot product processors 210A to 210D, respectively.

By configuring the one or more graphics texture ALUs to perform the deep learning operations by mapping the respective workloads to the input channels as described above, the graphics texture ALUs can be used to maximize the system resources of the device 100 as shown in FIG. 1, where the graphics processing pipeline 107 would otherwise by unused or idle during this process. Moreover, as also described above, the weight batch feature may be predetermined and selected in order to determine and/or configure the desired output of the convolution function 330. In an aspect, the final output values of the accumulators 220A to 220D can be configured to identify the content of the image, a prediction of the next image in the image sequence of the video content, one or more missing parts of the image and/or the like, using the deep learning operations performed by the one or more graphics texture ALUs.

Figure 6:
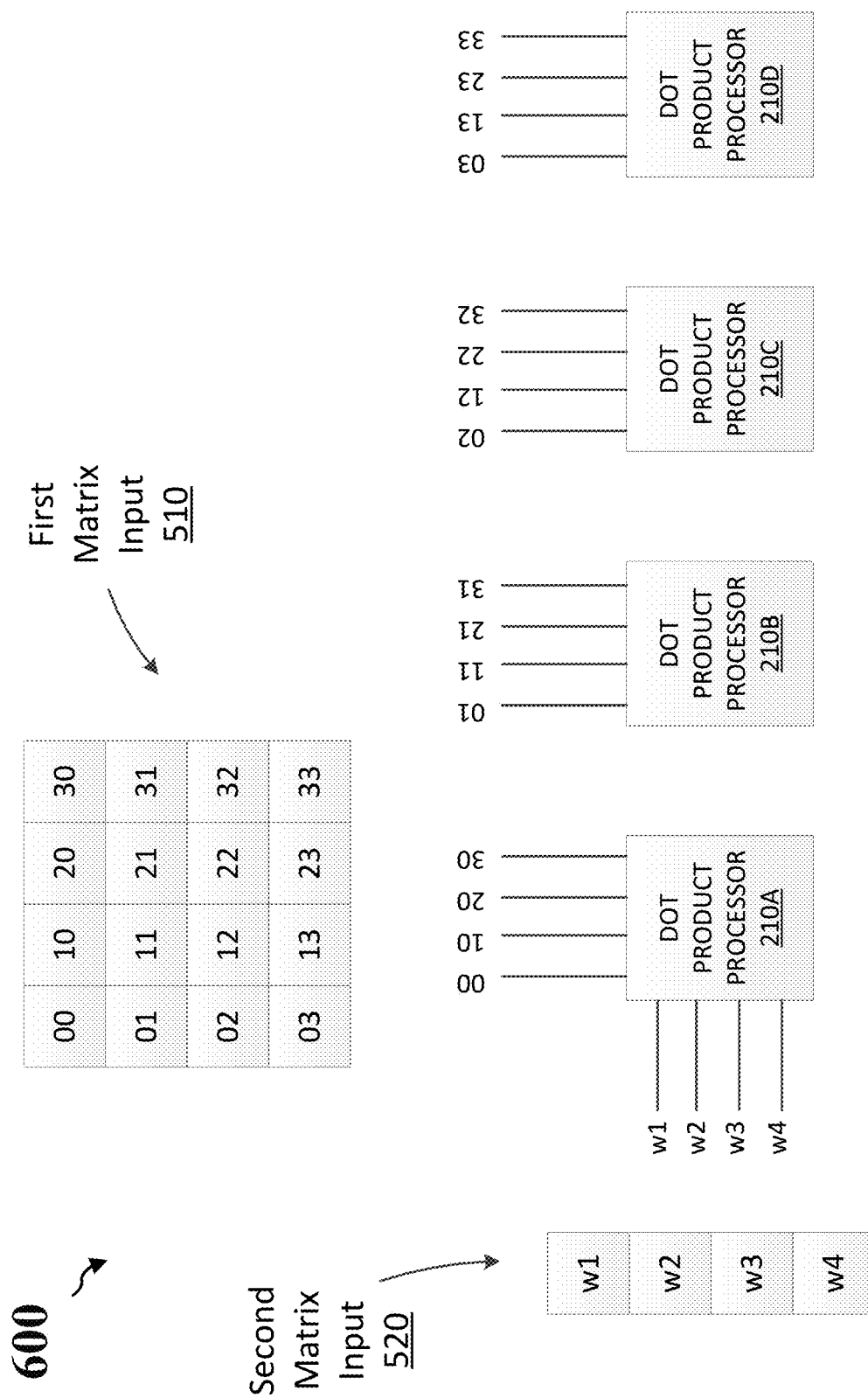
FIG. 6 illustrates an example diagram in accordance with one or more techniques of this disclosure.

FIG. 6 illustrates an example diagram in accordance with one or more techniques of this disclosure. In this aspect, a configuration 600 is provided in which the deep learning operations can include matrix multiplication operations, which produces a single matrix output from two matrices that are input as the workloads for the deep learning operation. In this case, a first matrix having a size N, M (e.g., 16×4 matrix) multiplied by a second matrix have a size L, N (e.g., 8×16) will output a matrix having a size L, M (e.g., 8×4).

Similar to the technique described above, the deep learning configuration controller 198 can be configured to reconfigure the one or more graphics texture ALUs of the graphics processing pipeline 107 to perform matrix multiplying operations, by mapping the workload (i.e., the first and second matrices) for the deep learning architecture to the input channels of the one or more graphics texture ALUs. In other words, the deep learning configuration controller 198 can change the input channels of the one or more graphics texture ALUs to utilize their configurations for performing the matrix multiplying operations according to an aspect.

As shown in FIG. 6, a first workload (e.g., the first matrix input 510) can be mapped to the RGBA input channels of the dot product processors 210A to 210D in a similar technique as described above. In other words, the first row of values of the matrix 510 is mapped to the input channels of dot product processor 210A, the second row of values of the matrix 510 is mapped to the input channels of dot product processor 210B, the third row of values of the matrix 510 is mapped to the input channels of dot product processor 210C, and the fourth row of values of the matrix 510 is mapped to the input channels of dot product processor 210D. Moreover, the second workload (e.g., second matrix input 520) may be a 1×4 matrix of weight features that are mapped to each of the bi-linear weight inputs of the dot product processors 210A to 210D.

Figure 7:
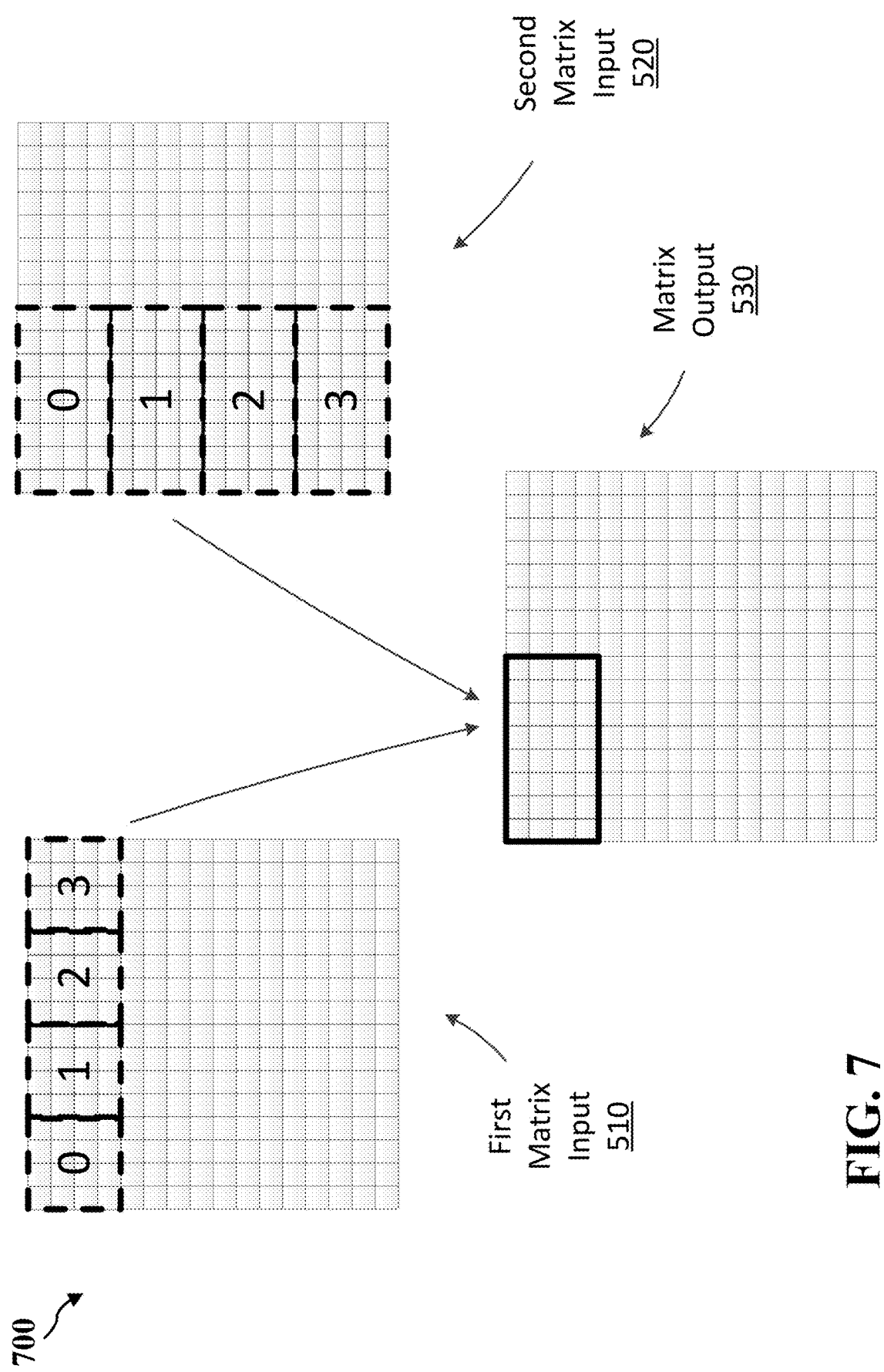
FIG. 7 illustrates an example diagram in accordance with one or more techniques of this disclosure.

In an aspect, by inputting the 4×4 matrix 510 to the first input channels of the dot product processors 210A to 210D and the 1×4 matrix 520 to the second input channels of the dot product processors 210A to 210D, a pixel result is output from the dot product processors 210A to 210D, which can be a 1×4 matrix according to the techniques described above. Moreover, the deep learning configuration controller 198 is configured to perform a recursive looping of the first matrix 510 and second matrix 520 with accumulators 220A to 220D generating respective outputs using similar techniques as described above FIG. 7 illustrates an example diagram in accordance with one or more techniques of this disclosure. As described above, an operation 700 is performed in which the deep learning operations can be a matrix multiplication operation that uses any size matrices as the input workload. In an aspect, the first matrix input 510 and second matrix input 520 can each be a 16×16 value matrix. As shown, the output result of the matrix multiplication will also be a 16×16 matrix. Moreover, the accumulated result of the first four cycle loops (i.e., 0-3 of each of the first and second matrices 510 and 520) will produce a first 8×4 matrix, which is provided in the upper left positions (e.g., 32 output values) of the matrix output 530. A second four cycle loops will then produce a subsequent 8×4 matrix in the matrix output 530 and so forth, effectively accumulating the output values to execute the matrix multiplication operation. As a result, the deep learning configuration controller 198 can enable the graphics texture ALUs to execute the matrix multiplication for deep learning operations by mapping the respective workload inputs to the existing input channels of the dot product processors 210A to 210D. As a result, the graphics texture ALUs of a graphics processing pipeline 107 can be configured as a deep learning architecture when they would otherwise be idle and unused for these processes.

Figure 8:
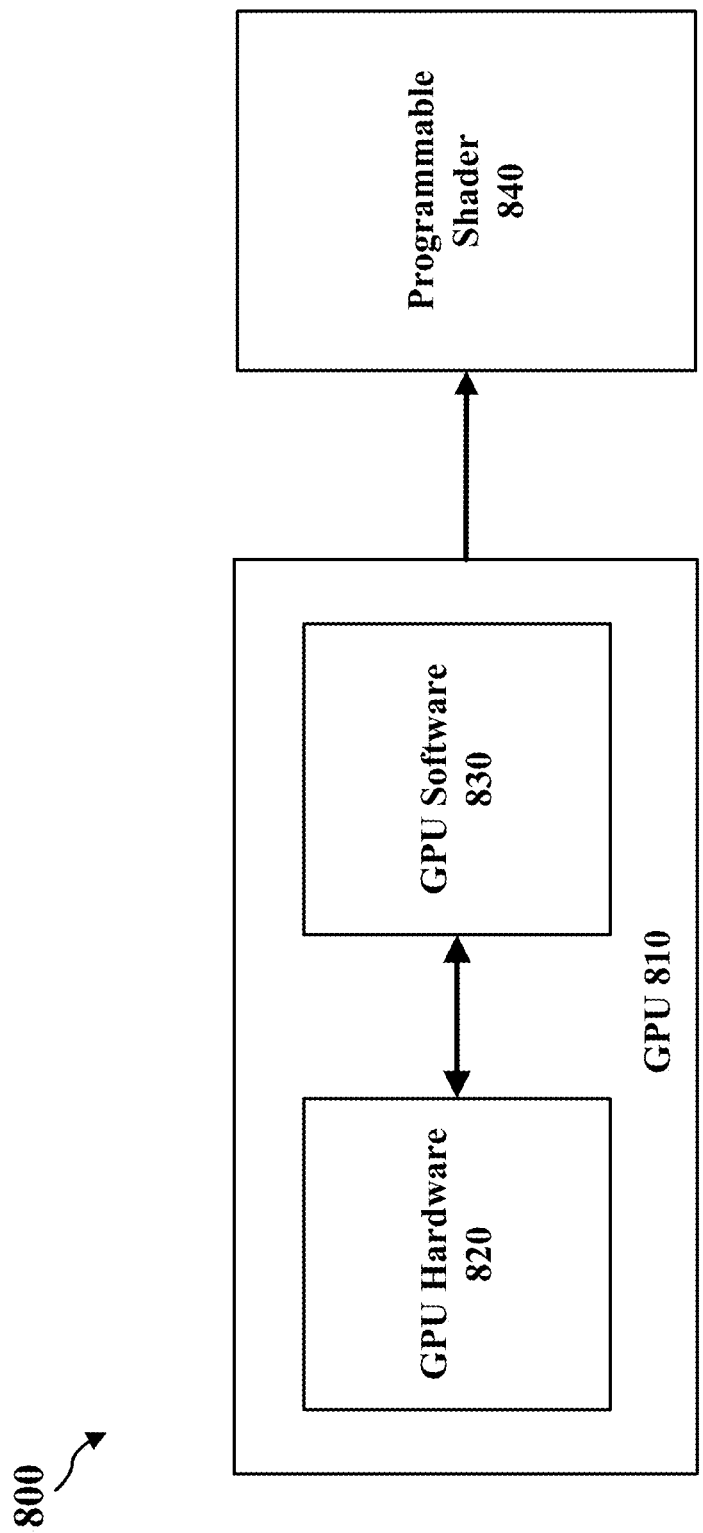
FIG. 8 illustrates diagram in accordance with one or more techniques of this disclosure.

FIG. 8 illustrates diagram 800 in accordance with one or more techniques of this disclosure. As shown in FIG. 8, diagram 800 includes GPU 810, which can include GPU hardware 820 and GPU software 830. In an aspect, GPU hardware 820 can correspond to the processing unit 120 that includes the texture filtering ALUs described above and GPU software 830 can correspond to the deep learning configuration controller 198. Additionally, diagram 800 includes a programmable shader 840. As shown in FIG. 8, GPU 810 can communicate with (or include as part of a graphics processing pipeline) programmable shader 840, using communication interface 126 in an aspect. In turn, the programmable shader 840 may be configured to analyze the output results from the deep learning operations executed by the one or more texture filtering ALUs as also described above. In an aspect, programmable shader 840 may be any type of software and/or hardware processing unit configured to analyze the output results of the deep learning operation. Thus, FIG. 8 illustrates some of the components that the present disclosure may utilize for the deep learning operation techniques mentioned herein.

Figure 9:
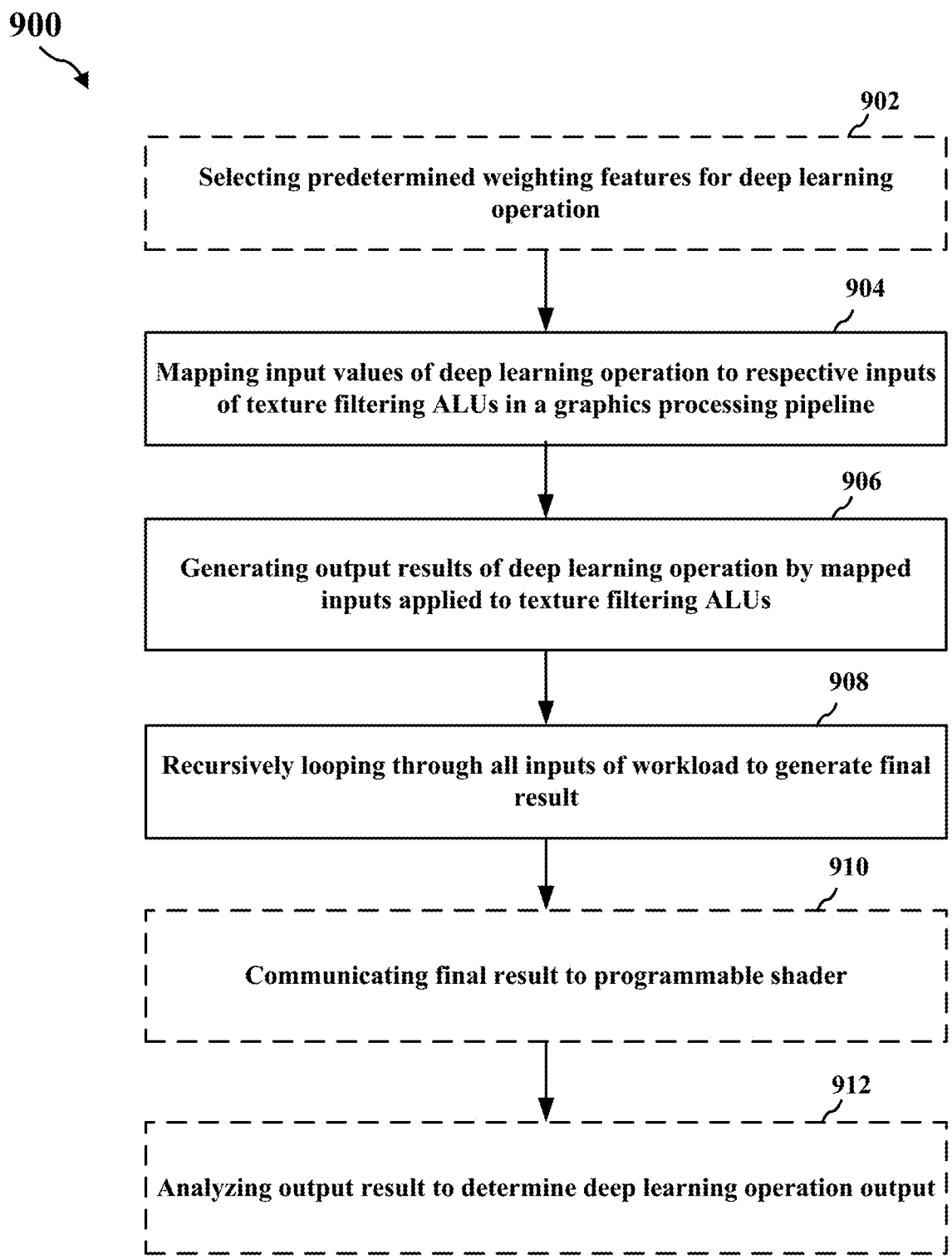
FIG. 9 illustrates an example flowchart in accordance with one or more techniques of this disclosure.

FIG. 9 illustrates an example flowchart 900 of an example method in accordance with one or more techniques of this disclosure. The method may be performed by an apparatus such as a GPU as described above. In an aspects, the steps highlighted by a dashed box illustrate optional steps in an aspect of the technique described herein.

At block 902, predetermined weighting features are selected for the deep learning operation. As described above, the predetermined weighting features can be selected to determine the type of output that will be generated by the deep learning operation. In an aspect, the output results can include at least one of an identification of content of an image, a prediction of a next image in an image sequence of the content, an identification of a missing part of the image and the like At block 904, the input values (i.e., the workload) that can include the weight features and activation features are mapped to respective inputs of the texture filtering ALUs of an existing graphics processing pipeline to effectively configure the texture filtering ALUs to perform the deep learning operation. Alternatively, the input values can be a pair of matrices if the deep learning operation is a matrix multiply operation. At block 906, the texture filtering ALUs generate output results based on the mapped inputs. The process is recursively looped for the input workloads to generate a final result at step 908.

At block 910, the final results can be communicated to a processing component (e.g., a programmable shader). Finally, at block 912, the programmable shader can analyze the output results of the deep learning operations performed by the texture filtering ALUs to determine features of the input image. As a result, the texture filtering ALUs can be utilized by the GPU for performing deep learning operations and maximizing use of resources during image processing.

Effectively, the subject matter described herein can be implemented to realize one or more benefits or advantages. For instance, the techniques disclosed herein enable the texture filtering ALUs to execute convolution and/or matrix multiple operations by mapping deep learning workloads to existing texture filtering ALUs with minimal additional use of resources. As a result the apparatus and method utilize the existing texture filtering ALUs that would otherwise be unused or idle during the GPUs execution of deep learning operations to gain better performance of the overall system. Thus, the processing techniques herein can improve or speed up data processing or execution and also improve resource or data utilization and/or resource efficiency.

In accordance with this disclosure, the term "or" may be interpreted as "and/or" where context does not dictate otherwise. Additionally, while phrases such as "one or more" or "at least one" or the like may have been used for some features disclosed herein but not others, the features for which such language was not used may be interpreted to have such a meaning implied where context does not dictate otherwise.

In one or more examples, the functions described herein may be implemented in hardware, software, firmware, or any combination thereof. For example, although the term "processing unit" has been used throughout this disclosure, such processing units may be implemented in hardware, software, firmware, or any combination thereof. If any function, processing unit, technique described herein, or other module is implemented in software, the function, processing unit, technique described herein, or other module may be stored on or transmitted over as one or more instructions or code on a computer-readable medium. Computer-readable media may include computer data storage media or communication media including any medium that facilitates transfer of a computer program from one place to another. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. By way of example, and not limitation, such computer-readable media can comprise RAM, ROM, EEPROM, CD-ROM or other optical disk storage, magnetic disk storage or other magnetic storage devices. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media. A computer program product may include a computer-readable medium.

The code may be executed by one or more processors, such as one or more digital signal processors (DSPs), general purpose microprocessors, application specific integrated circuits (ASICs), arithmetic logic units (ALUs), field programmable logic arrays (FPGAs), or other equivalent integrated or discrete logic circuitry. Accordingly, the term "processor," as used herein may refer to any of the foregoing structure or any other structure suitable for implementation of the techniques described herein. Also, the techniques could be fully implemented in one or more circuits or logic elements.

The techniques of this disclosure may be implemented in a wide variety of devices or apparatuses, including a wireless handset, an integrated circuit (IC) or a set of ICs, e.g., a chip set. Various components, modules or units are described in this disclosure to emphasize functional aspects of devices configured to perform the disclosed techniques, but do not necessarily need realization by different hardware units. Rather, as described above, various units may be combined in any hardware unit or provided by a collection of intraoperative hardware units, including one or more processors as described above, in conjunction with suitable software and/or firmware.

Various examples have been described. These and other examples are within the scope of the following claims.

What is claimed is:

1. A method for a deep learning operation, the method comprising:
   mapping one or more inputs of the deep learning operation to a respective input of at least one texture filtering logic unit in a graphics pipeline, wherein the one or more inputs are based on one or more batch weight features and one or more activation features, wherein the one or more batch weight features include a batch size and the one or more activation features include a feature size;

generating, by the at least one texture filtering logic unit, at least one output for the deep learning operation based on the one or more inputs mapped to the at least one texture filtering logic unit; and communicating the at least one output to a programmable shader.

2. The method of claim 1, wherein the mapping of the one or more inputs comprises mapping a plurality of batch weight features and a plurality of activation features to respective inputs of the at least one texture filtering logic unit.

3. The method of claim 1, wherein the at least one texture filtering logic unit comprises a plurality of texture filtering arithmetic logic units (ALUs).

4. The method of claim 3, further comprising:
mapping a plurality of batch weight features to respective red, green, blue, alpha (RGBA) input channels of the plurality of texture filtering ALUs; and
mapping a plurality of activation features to respective weight input channels of the plurality of texture filtering ALUs.

5. The method of claim 4, further comprising executing a convolution operation as a dot product and accumulation of the plurality of batch weight features in a first two-dimensional array with the plurality of activation features in a second two-dimensional array.

6. The method of claim 5, further comprising:
recursively looping through a plurality of first and second two-dimensional arrays; and
accumulating respective outputs of the plurality of texture filtering ALUs to generate the at least one output for the deep learning operation by applying respective current outputs of the convolution operation with previously accumulated outputs of the convolution operation.

7. The method of claim 1, further comprising generating the at least one output for the deep learning operation based on a matrix operation.

8. The method of claim 7, wherein the one or more inputs of the deep learning operation comprises one or more input matrices and at least one output matrix that corresponds to the generated at least one output for the deep learning operation.

9. The method of claim 8, wherein the generating of the at least one output for the deep learning operation comprises calculating the at least one output by multiplying the one or more input matrices to produce the at least one output matrix.

10. The method of claim 1, further comprising storing the at least one output in an electronic memory.

11. The method of claim 1, further comprising mapping at least one batch of predetermined weight features as the one or more inputs of the deep learning operation to the respective input of the at least one texture filtering logic unit in the graphics pipeline to define the at least one output for the deep learning operation.

12. The method of claim 11, wherein the at least one output for the deep learning operation indicates at least one of an identification of content of an image, a prediction of a next image in an image sequence of the content, and an identification of a missing part of the image.

13. An apparatus for a deep learning operation, the apparatus comprising:
a memory; and
at least one processor coupled to the memory and configured to:
map one or more inputs of the deep learning operation to a respective input of at least one texture filtering logic unit in a graphics pipeline, wherein the one or more inputs are based on one or more batch weight features and one or more activation features, wherein the one or more batch weight features include a batch size and the one or more activation features include a feature size;
generate, by the at least one texture filtering logic unit, at least one output for the deep learning operation based on the one or more inputs mapped to the at least one texture filtering logic unit; and
communicate the at least one output to a programmable shader.

14. The apparatus of claim 13, wherein the at least one processor is further configured to map a plurality of batch weight features and a plurality of activation features to respective inputs of the at least one texture filtering logic unit.

15. The apparatus of claim 13, wherein the at least one texture filtering logic unit comprises a plurality of texture filtering arithmetic logic units (ALUs).

16. The apparatus of claim 15, wherein the at least one processor is further configured to:
map a plurality of batch weight features to respective red, green, blue, alpha (RGBA) input channels of the plurality of texture filtering ALUs; and
map a plurality of activation features to respective weight input channels of the plurality of texture filtering ALUs.

17. The apparatus of claim 16, wherein the at least one processor is further configured to execute a convolution operation as a dot product and accumulation of the plurality of batch weight features in a first two-dimensional array with the plurality of activation features in a second two-dimensional array.

18. The apparatus of claim 17, wherein the at least one processor is further configured to:
recursively loop through a plurality of first and second two-dimensional arrays; and
accumulate respective outputs of the plurality of texture filtering ALUs to generate the at least one output for the deep learning operation by applying respective current outputs of the convolution operation with previously accumulated outputs of the convolution operation.

19. The apparatus of claim 13, wherein the at least one processor is further configured to generate the at least one output for the deep learning operation based on a matrix operation.

20. The apparatus of claim 19, wherein the one or more inputs of the deep learning operation comprises one or more input matrices and at least one output matrix that corresponds to the generated at least one output for the deep learning operation.

21. The apparatus of claim 20, wherein the at least one processor is further configured to generate the at least one output for the deep learning operation by calculating the at least one output by multiplying the one or more input matrices to produce the at least one output matrix.

22. The apparatus of claim 13, wherein the at least one processor is further configured to store the at least one output in an electronic memory.

23. The apparatus of claim 13, wherein the at least one processor is further configured to map at least one batch of predetermined weight features as the one or more inputs of the deep learning operation to the respective input of the at least one texture filtering logic unit in the graphics pipeline to define the at least one output for the deep learning operation.

24. The apparatus of claim 23, wherein the at least one output for the deep learning operation indicates at least one of an identification of content of an image, a prediction of a next image in an image sequence of the content, and an identification of a missing part of the image.

25. The apparatus of claim 13, wherein the graphics pipeline is a graphics processing unit (GPU) fixed pipeline.

26. The apparatus of claim 25, wherein the at least one texture filtering logic unit comprises a render target blending arithmetic logic unit.

27. An apparatus for a deep learning operation, the apparatus comprising:
   means for mapping one or more inputs of the deep learning operation to a respective input of at least one texture filtering logic unit in a graphics pipeline, wherein the one or more inputs are based on one or more batch weight features and one or more activation features, wherein the one or more batch weight features include a batch size and the one or more activation features include a feature size;
   means for generating, by the at least one texture filtering logic unit, at least one output for the deep learning operation based on the one or more inputs mapped to the at least one texture filtering logic unit; and
   means for communicating the at least one output to a programmable shader.

28. A non-transitory computer-readable medium storing computer executable code for a deep learning operation, the code when executed by a processor causes the processor to:
   map one or more inputs of the deep learning operation to a respective input of at least one texture filtering logic unit in a graphics pipeline, wherein the one or more inputs are based on one or more batch weight features and one or more activation features, wherein the one or more batch weight features include a batch size and the one or more activation features include a feature size;
   generate, by the at least one texture filtering logic unit, at least one output for the deep learning operation based on the one or more inputs mapped to the at least one texture filtering logic unit; and
   communicate the at least one output to a programmable shader.

* * * * *